US010542315B2

(12) United States Patent
Shaw et al.

(10) Patent No.: US 10,542,315 B2
(45) Date of Patent: Jan. 21, 2020

(54) METHOD AND APPARATUS FOR CONTENT ADAPTATION BASED ON AUDIENCE MONITORING

(71) Applicant: AT&T INTELLECTUAL PROPERTY I, LP, Atlanta, GA (US)

(72) Inventors: Venson Shaw, Kirkland, WA (US); Sangar Dowlatkhah, Johns Creek, GA (US); Zhi Cui, Sugar Hill, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 145 days.

(21) Appl. No.: 14/938,421

(22) Filed: Nov. 11, 2015

(65) Prior Publication Data

US 2017/0134803 A1    May 11, 2017

(51) Int. Cl.
*H04N 21/442* (2011.01)
*H04N 21/466* (2011.01)
(Continued)

(52) U.S. Cl.
CPC ....... *H04N 21/44218* (2013.01); *G10L 15/22* (2013.01); *H04N 21/234363* (2013.01);
(Continued)

(58) Field of Classification Search
CPC ......... H04N 21/44218; H04N 21/4415; H04N 21/234363; H04N 21/252; G10L 15/22
See application file for complete search history.

(56) References Cited

U.S. PATENT DOCUMENTS 6,078,349 A * 6/2000 Molloy ................ G06F 3/0481
348/14.07
6,708,335 B1    3/2004 Ozer et al.
(Continued)

FOREIGN PATENT DOCUMENTS

CA      2823346 A1     7/2012
WO   2006043925 A1     4/2006
(Continued)

OTHER PUBLICATIONS

"New DVRs will use cameras and microphones to monitor their owners." RT News, Dec. 5 RT News 2012.
(Continued)

*Primary Examiner* — Brian T Pendleton
*Assistant Examiner* — Frank Johnson
(74) *Attorney, Agent, or Firm* — Guntin & Gust, PLC; John G. Rauch

(57) ABSTRACT

Aspects of the subject disclosure include, for example, embodiments that include determining a content context of a first segment of content being presented by a media processor at a display to an audience. Further embodiments include determining an expected audience reaction according to the content context of the first segment, and receiving sensor data captured from a sensor device in proximity to the audience where the sensor data is indicative of a sensed audience reaction to the first segment of the content. Additional embodiments include comparing the sensed audience reaction with the expected audience reaction to determine a level of interest in the first segment, and adjusting a second segment of the content according to the level of interest to generate an adjusted second segment displayable at the display. Other embodiments are disclosed.

20 Claims, 6 Drawing Sheets

(51) Int. Cl.
  *H04N 21/25* (2011.01)
  *H04N 21/845* (2011.01)
  *H04N 21/81* (2011.01)
  *H04N 21/422* (2011.01)
  *H04N 21/2343* (2011.01)
  *G10L 15/22* (2006.01)

(52) U.S. Cl.
  CPC ..... *H04N 21/252* (2013.01); *H04N 21/42203* (2013.01); *H04N 21/4667* (2013.01); *H04N 21/812* (2013.01); *H04N 21/8456* (2013.01)

(56) References Cited

U.S. PATENT DOCUMENTS

| | | | |
|---|---|---|---|
| 6,904,408 B1 | 6/2005 | McCarthy et al. | |
| 7,409,639 B2 | 8/2008 | Dempski et al. | |
| 7,492,821 B2* | 2/2009 | Berman | H04N 21/4223 375/240.1 |
| 7,889,073 B2 | 2/2011 | Zalewski | |
| 8,302,123 B2 | 10/2012 | Versteeg et al. | |
| 8,516,105 B2 | 8/2013 | Chawla et al. | |
| 8,635,637 B2 | 1/2014 | Mendhro et al. | |
| 8,764,652 B2 | 7/2014 | Lee et al. | |
| 8,898,687 B2* | 11/2014 | Hulten | H04N 21/442 725/12 |
| 8,910,199 B2 | 12/2014 | Johnson et al. | |
| 8,924,549 B2 | 12/2014 | Raleigh | |
| 8,931,064 B2 | 1/2015 | Barbir | |
| 8,949,871 B2 | 2/2015 | Chai et al. | |
| 9,009,298 B2 | 4/2015 | Besehanic et al. | |
| 9,071,886 B2 | 6/2015 | Shkedi | |
| 9,100,685 B2 | 8/2015 | Conrad et al. | |
| 2003/0052911 A1* | 3/2003 | Cohen-solal | H04L 29/06027 715/738 |
| 2003/0093784 A1 | 5/2003 | Dimitrova | |
| 2005/0289582 A1 | 12/2005 | Tavares et al. | |
| 2007/0038516 A1 | 2/2007 | Apple | |
| 2007/0214471 A1* | 9/2007 | Rosenberg | H04H 20/38 725/24 |
| 2008/0169930 A1 | 7/2008 | Mallinson et al. | |
| 2008/0320082 A1 | 12/2008 | Kuhlke et al. | |
| 2009/0006694 A1* | 1/2009 | Horvitz | H04N 7/163 710/262 |
| 2010/0070987 A1 | 3/2010 | Amento et al. | |
| 2010/0211966 A1* | 8/2010 | Zhang | H04H 60/33 725/10 |
| 2012/0017231 A1 | 1/2012 | Chao et al. | |
| 2012/0146891 A1* | 6/2012 | Kalinli | H04N 19/33 345/156 |
| 2012/0197824 A1 | 8/2012 | Donovan et al. | |
| 2012/0210383 A1* | 8/2012 | Sayers | H04N 21/2393 725/116 |
| 2013/0080260 A1* | 3/2013 | French | H04H 60/33 705/14.66 |
| 2013/0205314 A1* | 8/2013 | Ramaswamy | H04N 21/44213 725/14 |
| 2013/0232515 A1* | 9/2013 | Rivera | H04N 21/44213 725/12 |
| 2014/0022332 A1* | 1/2014 | Wang | H04M 3/567 348/14.07 |
| 2014/0298364 A1* | 10/2014 | Stepanov | H04N 21/25 725/10 |
| 2014/0337868 A1* | 11/2014 | Garza | H04N 21/44218 725/12 |
| 2014/0337880 A1 | 11/2014 | Sorbel et al. | |
| 2015/0143392 A1* | 5/2015 | Silveira-Filho | H04H 60/33 725/10 |
| 2015/0189376 A1* | 7/2015 | Bazata | H04N 21/4263 725/114 |
| 2015/0264299 A1* | 9/2015 | Leech | H04N 7/0117 348/78 |
| 2015/0281783 A1* | 10/2015 | Laksono | H04N 21/44222 725/10 |
| 2015/0341411 A1* | 11/2015 | Huber | H04L 65/4092 709/231 |
| 2016/0080448 A1* | 3/2016 | Spears | H04L 65/602 709/219 |
| 2016/0134904 A1* | 5/2016 | Xu | H04N 21/2385 725/116 |
| 2016/0182955 A1* | 6/2016 | Klappert | H04N 21/4668 725/14 |
| 2016/0232561 A1* | 8/2016 | Kikuchi, II | A61B 5/16 |
| 2016/0366454 A1* | 12/2016 | Tatourian | H04N 21/23434 |
| 2017/0055017 A1* | 2/2017 | Christie | A61B 5/165 |

FOREIGN PATENT DOCUMENTS

| | | |
|---|---|---|
| WO | 2011035286 A1 | 3/2011 |
| WO | 2011163411 A2 | 12/2011 |
| WO | 2012150602 A1 | 11/2012 |
| WO | 2015031671 A1 | 3/2015 |
| WO | 2015042472 A1 | 3/2015 |

OTHER PUBLICATIONS

Baldassarri, Sandra et al., "Affective-aware tutoring platform for interactive digital television," Multimedia Tools and Applications 74.9 (2015): 3183-3206.

Degli Esposti, Sara, "When big data meets dataveillance: the hidden side of analytics," Surveillance & Society 12.2 (2014): 209-225.

Park, Byong-Ha et al., "Contents Recommendation Type IPTV Service Technology based on Reactive Emotion Reasoning," ICEIC : 2010, 2010.6, 459-461.

Soladie, Catherine et al., "Invariant representation of facial expressions for blended expression recognition on unknown subjects," Computer Vision and Image Understanding 117.11 (2013): 1598-1609.

* cited by examiner

100

200

METHOD AND APPARATUS FOR CONTENT ADAPTATION BASED ON AUDIENCE MONITORING

FIELD OF THE DISCLOSURE

The subject disclosure relates to a method and apparatus for content adaptation based on audience monitoring.

BACKGROUND

Users have various options to select from in communication services. Selection of content for presentation to the users including movies, programming, advertising and the like is often performed based on generalizations associated with demographics, such as age and gender. However, not all users fit those generalizations which can lead to selection of content which is not of interest to a particular user.

BRIEF DESCRIPTION OF THE DRAWINGS

Reference will now be made to the accompanying drawings, which are not necessarily drawn to scale, and wherein.

DETAILED DESCRIPTION

Figure 1:
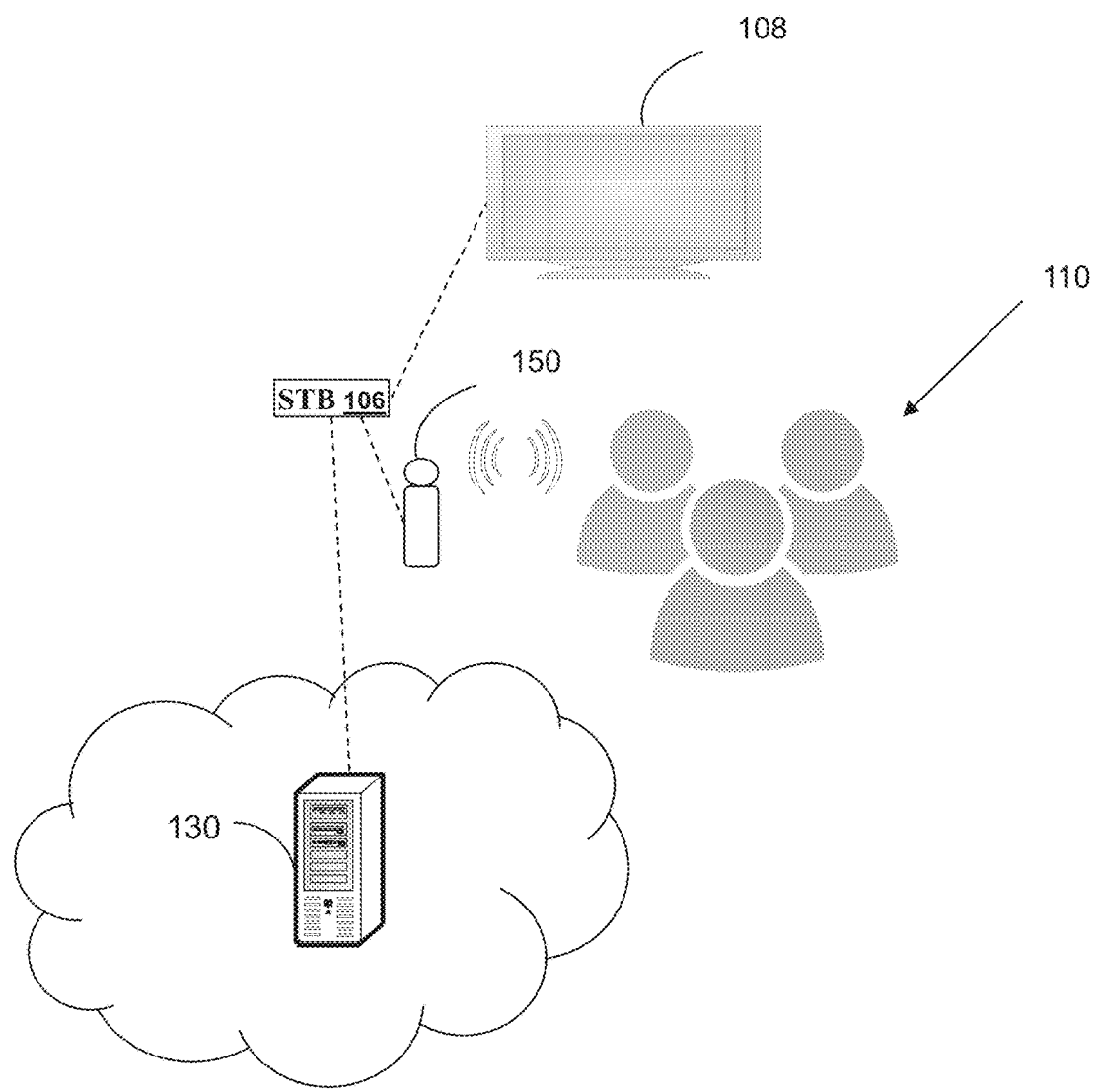
FIGS. 1 and 2 depict illustrative embodiments of content adjustment systems that can adjust content according to monitored audience reaction.

The subject disclosure describes, among other things, illustrative embodiments for adjusting content based on the reaction of the audience. The audience reaction can be compared to an expected audience reaction that is determined from a context of the particular segment of content that the audience is viewing. The audience reaction can be utilized to determine a level of interest or a change in the level of interest which can trigger an adjustment of the content. Various criteria can be utilized for comparing the actual and expected audience reaction, including monitoring sound volume or determining a context of the audience reaction, such as whether there is excitement directed towards the content or whether the captured sounds are part of a conversation indicating disinterest in the content, or even different environments, such as mobility state or the vibration pattern of the mobile device (via which content is delivered) in a car or a train. Other embodiments are described in the subject disclosure.

One or more aspects of the subject disclosure are a method including determining, by a system including a processor, a content context of a first segment of content being presented at a display to an audience. The method can include determining, by the system, an expected audience reaction according to the content context of the first segment, where the expected audience reaction comprises an expected volume and an expected audio reaction context. The method can include obtaining, by the system, sensor data captured from a sensor device in proximity to the audience, where the sensor data is indicative of a sensed audience reaction to the first segment of the content, and where the sensed audience reaction comprises a sensed volume and a sensed audio reaction context. The method can include comparing, by the system, the sensed volume and the sensed audio reaction context with the expected volume and the expected audio reaction context to determine a level of interest in the first segment. The method can include adjusting, by the system, a second segment of the content according to the level of interest to generate an adjusted second segment displayable at the display.

One or more aspects of the subject disclosure include a machine-readable storage medium, comprising executable instructions that, when executed by a media processor, facilitate performance of operations, including determining a content context of a first segment of content. The media processor can present the first segment of the content at a display to an audience; and can determine an expected audience reaction according to the content context of the first segment, where the expected audience reaction comprises an expected audio reaction context. The media processor can obtain sensor data captured from a sensor device in proximity to the display, where the sensor data is indicative of a sensed audience reaction to the first segment of the content. The media processor can apply speech pattern recognition to the sensor data to determine a sensed audio reaction context of the sensed audience reaction. The media processor can compare the sensed audio reaction context with the expected audio reaction context to determine a level of interest in the first segment. The media processor can increase a resolution of a second segment of the content according to a determination that the level of interest has increased, where the increasing of the resolution of the second segment generates an adjusted second segment. The media processor can present the adjusted second segment at the display. The media processor can provide a notice to a second media processor that causes the second media processor to decrease another resolution of other content being presented by the second media processor.

One or more aspects of the subject disclosure include a network server having a processor; and a memory that stores executable instructions that, when executed by the processor, facilitate performance of operations, including determining a content context of a first segment of content being presented by a media processor at a display to an audience. The network server can determine an expected audience reaction according to the content context of the first segment, where the expected audience reaction comprises an expected audio reaction context. The network server can receive sensor data captured from a sensor device in proximity to the audience, where the sensor data is indicative of a sensed audience reaction to the first segment of the content. The network server can apply speech recognition to the sensor data to identify words spoken by the audience. The network server can determine a sensed audio reaction context according to the words. The network server can compare the sensed audio reaction context with the expected audio reaction context to determine a level of interest in the first segment. The network server can adjust a second segment of the content according to the level of interest to generate an adjusted second segment displayable at the display.

FIG. 1 depicts an illustrative embodiment of a system 100 in which content is presented by a media processor 106 (e.g., a set top box) at a display 108 (e.g., a television). An audience 110 can be viewing or otherwise consuming the content. Three users are illustrated for audience 110, although the audience could be a single user or any other number of users. Also, the media processor 106, the display 108 and the audience 110 are illustrated at a single location (e.g., a single premises), however, the media processor, the display and the audience can be groups of media processors, displays and audiences that are located at different locations, such as different premises. The content can be provided to the media processor 106 by a network server 130.

In one embodiment, one or more sensor devices 150 (only one of which is shown) can capture sensor data of a sensed audience reaction for the audience 110. The sensor data can be of various types including audio and/or image information. In one embodiment, the sensor device 150 can be integrated with the media processor 106 or can be otherwise in communication with the media processor to provide the sensor data to the media processor. In another embodiment, the sensor device 150 can be a separate device from the media processor 106, where the sensor device provides the sensor data to the network server 130 with or without sharing the sensor data with the media processor.

Combinations of sensor devices 150 can also be utilized, such as a first sensor device that is an audio recorder of the media processor 106 and a second sensor device that is a camera for capturing images of the audience 110. For instance, the camera can be integrated with the media processor 106 or can be otherwise in communication with the media processor to provide the sensor data to the media processor, or the camera can be a separate device from the media processor, where the camera provides the sensor data to the network server 130 with or without sharing the sensor data with the media processor.

In another embodiment, the sensor device 150 can be part of an end user device of one or more of the users in the audience 110. For example, a mobile phone of a user of the audience 110 can record audio and provide that audio to the media processor 106 and/or to the network server 130. In addition to audio and image recordings, the sensor device 150 can capture other sensor data, such as motion detection, lighting and so forth.

System 100 enables determining a level of interest or a change in the level of interest for a particular segment of the content being presented so that a content adaptation can be performed. For example, a determination can be made for a content context of a first segment of the content being presented at the display 108 for the audience 110. The content context can be performed based on various factors and utilizing various techniques. In one embodiment, segments of the content can include or otherwise be associated with metadata that can be accessed where the metadata describes the particular content context of the particular segment. For example, a movie can include metadata that describes various scenes in the movie. The content context can be categorized in such a way as to facilitate determining an expected audience reaction to the scene. For instance, the metadata can describe that the scene is funny from which it can be determined that audience laughter is expected. As another example, the metadata can describe that the scene is scary from which it can be determined that an audience scream and/or an audience movement is expected. As another example, the metadata can describe that the scene is somber from which it can be determined that audience quiet is expected. The metadata can also be utilized for determining that which is not an expected reaction of the audience, such as it is not expected for there to be laughter in a scene that is described by the metadata as tragic.

In another embodiment, pattern recognition can be applied to the segment of the content to determine the content context and thus the expected audience reaction. For example, audio and/or image pattern recognition can be applied to the segment to determine that a movie scene is scary or tragic. Detected words and/or sounds (e.g., laughter, scream, sighing, crying), detected actions, or other characteristics of the scene detected from the pattern recognition can be utilized in determining the particular content context. The pattern recognition can also be performed on live events that are being presented as the content. For instance, pattern recognition can be utilized to determine that a football team is close to the end zone from which it can be determined that the expected audience reaction can be excited (for an audience member favoring the team on offense) or discouraged (for an audience member favoring the team on defense). In one embodiment, an expected volume of audience reaction can be determined, such as determining that an audio reaction to a touchdown in a football game should be above a threshold level if the audience member is interested in the particular game. The determination of the content context can be performed by various devices, such as by the media processor 106 and/or the network server 130.

System 100 enables comparing an expected audience reaction with a sensed audience reaction to determine a level of interest or a change in the level of interest for a particular segment of the content being presented so that a content adaptation can be performed. The comparison can be performed by various devices, such as by the media processor 106 and/or the network server 130. As explained above, the expected and sensed audience reactions can be characterized in various ways, including audio volume, spoken words, sounds, movement and so forth.

Once a level of interest or a change in the level of interest for a particular segment of the content being presented is determine, then a content adaptation can be performed. The content adaptation can be of various types. For example, characteristics of the content can be adjusted, such as a resolution or quality, in response to a determination of an increased level of interest. For instance, a determination can be made that the audience has become more interested in a football game because the offensive team is near the end zone and may score a touchdown. As described above, this determination can be performed according to a comparison of the expected audience reaction and the sensed audience reaction. The content (i.e., the football game) can be adjusted to a high resolution so that the upcoming plays near the end zone are of a higher quality. In one embodiment, the system 100 can continue to monitoring for content context of subsequent segments, expected audience reactions for those subsequent segments, and sensed audience reactions for those subsequent segments, from which changes in level of interest can be determined. In this example, if it is determined that the level of interest decreases then the content can be adjusted again, such as lowering the resolution (for plays that are deemed to be of less interest to the audience).

In one embodiment, the adjustment of the resolution can be performed in conjunction with adjustment to other content being provided to the location. For instance, an increase in resolution at the media processor 106 resulting in an increase in bandwidth can be offset by a decrease in resolution at another media processor so that the bandwidth usage for the location are maintained relatively constant. In one embodiment, the location can have multiple audiences and multiple media processors where the monitoring for content context, expected audience reactions, and sensed audience reactions are performed for those multiple audiences, from which changes in level of interest can be determined for those multiple audiences. In this example, the changes in level of interest for each of the multiple audiences (at different displays watching different content) can be compared and the content adjustment can be made according to a higher level of change in interest. For instance, a first audience determined to have a higher level of interest can be presented with a high definition version of first content while a second audience determined to have a lower level of interest can be presented with a standard definition version of second content.

In one embodiment, the adjustment of the content can include inserting a different segment into the content, such as a targeted advertisement or a different version of a scene. In another embodiment, the adjustment of the content can include replacing the subsequent segments with completely different content, such as switching to a different episode of a show or a different movie.

In one embodiment, the monitoring of the audience reaction can be performed on an individual basis. For example, a captured audio reaction can be identified with a particular user of the audience and compared with an expected audio reaction for that user. User profiles and/or historical reactions for that particular user can be analyzed in conjunction with the content context to determine the expected audience reaction for that particular user. As an example, it can be determined that the content context for a scene in a movie is humor. It can be further determined that a particular user in the past has reacted with laughter at a particular volume. The sensed laughter for that particular user can be compared to the particular volume of past laughter to determine a level of interest in the scene for the particular user.

In one embodiment, a notification can be presented at the display 108 indicating that the content adjustment is going to occur (e.g., resolution of a subsequent segment of the content will be increased). In another embodiment, a characteristic of the audience can be determined (e.g., by the media processor 106 and/or the network server 130) based on a monitored consumption history associated with the audience. In this example, the adjusting of a subsequent segment of the content can include selecting a targeted advertisement from among a group of advertisements and providing the targeted advertisement for presentation at the display 108, where the selecting of the targeted advertisement is according to the determined level of interest and according to the characteristic of the audience.

In one or more embodiments, system 100 can teaches a video broadcast system how to insert and/or adapt content according to an audience signal-to-noise ratio. The audience signal-to-noise ratio can be a measure of expected audio to actual audio and can filter out background noise. System 100 can capture the mood, emotion, need and/or requirement of the audience at that particular moment. As a result, the content inserted and/or adapted to the video broadcast system can instantaneously capture the need and/or requirement of the audience at that moment. System 100 can enable content insertion to be adapted and personalized according to the audience signal-to-noise which is distinct from blindly or randomly inserting content.

Figure 2:
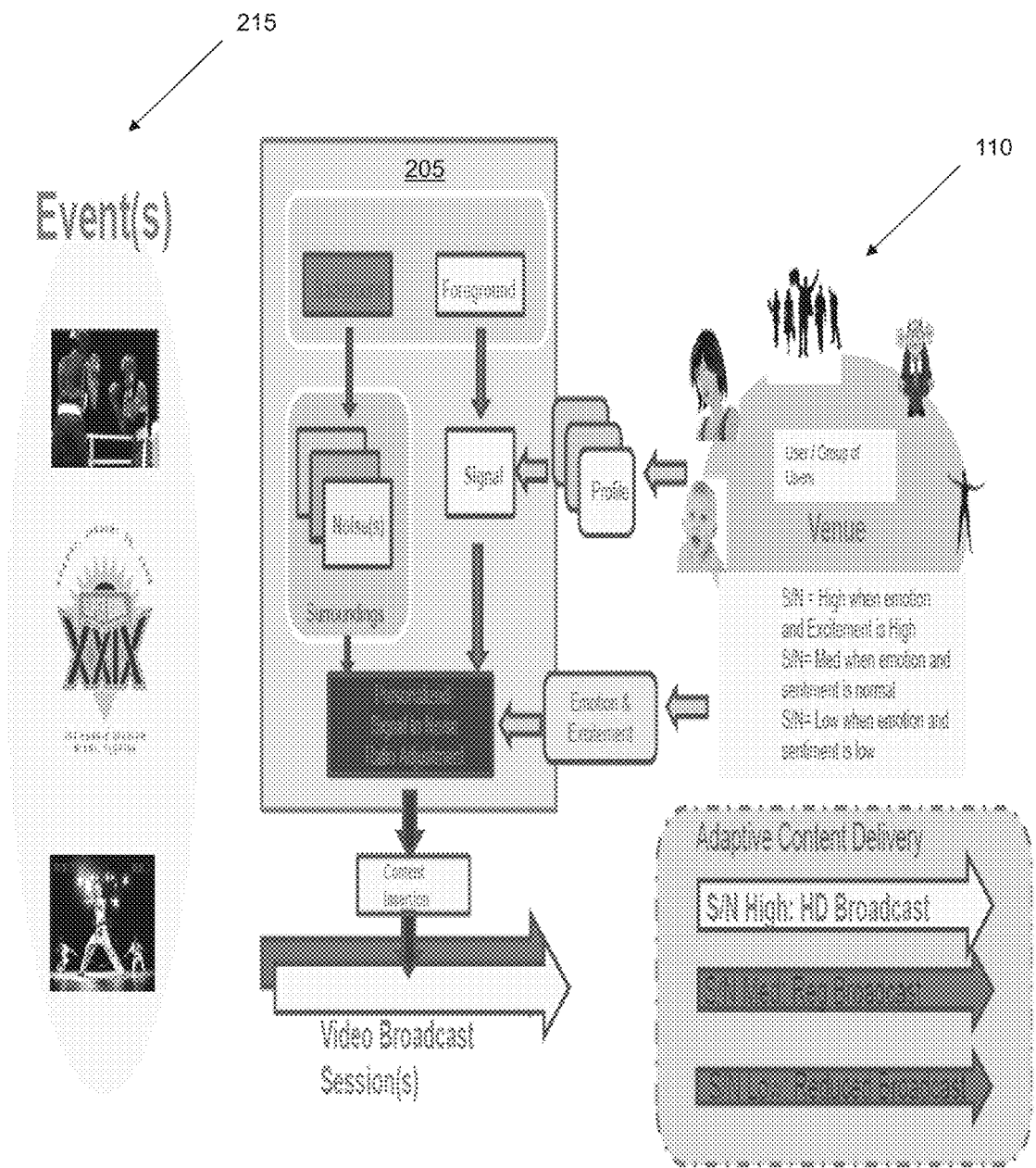

FIG. 2 depicts an illustrative embodiment of system 200 that enables content adaptation according to monitored audience reactions to segments of the content. By determining an expected audience reaction according to the context of the particular segment of content being presented, system 200 can detect a level of interest or a change in the level of interest via a comparison to a sensed audience reaction.

In one embodiment, a device 205 (e.g., a media processor presenting the content, a network server, or some other device) can determine a content context of a first segment of content being presented by the media processor to the audience 110. The content context determination can be performed utilizing various techniques including analyzing metadata that describes the segment content and/or performing pattern recognition (e.g., audio and/or image) to determine the segment context. An expected audience reaction can be determined according to the content context of the first segment, such as determining an expected audio reaction context (e.g., laughter, screaming, enthusiasm, anger, and so forth). The device 205 can obtain sensor data captured from one or more sensor devices in proximity to the audience, such as an audio recorder, a camera, a motion detector and so forth. In one embodiment, the sensor data can be indicative of a sensed audience reaction to the first segment of the content. In another embodiment, the sensor data can be filtered, such as removing background noise, to isolate the sensed audience reaction.

In one embodiment, speech recognition can be applied to the sensor data to identify words spoken by the audience. Based on the speech recognition, a sensed audio reaction context can be determined according to the words. For example, words indicative of anger or words indicative of sorrow can be identified. Device 205 can compare the sensed audio reaction context with the expected audio reaction context to determine a level of interest in the first segment. For instance, device 205 can determine that a sad scene in a movie should invoke a sorrowful audience reaction. If the comparison of the expected and sensed audience reactions is not a match then device 205 can determine that there is a low level of interest in the scene. In one embodiment, the device 205 can detect a sensed audience reaction which is contrary to what is expected, such as sensing laughter during a sad scene. Based on this detection, device 205 can determine there is little interest in the scene.

Based on a detection of a particular level of interest (e.g., satisfying a threshold), device 205 can adjust a second segment of the content according to the level of interest to generate an adjusted second segment for presentation at the display. In one embodiment, the adjusting of the second segment of the content can include adjusting a resolution of the second segment according to the level of interest. In another embodiment, the adjusting of the resolution of the second segment can be performed in conjunction with decreasing of another resolution of second content being presented by another media processor, where the media processor and the other media processor are located at a same premises.

In one embodiment, the display can be a group of displays located at different premises, where the audience 110 is a group of users located at the different premises. In this example, the sensor device can be a group of sensor devices that capture sensor data for the multiple audiences at the different premises. The content adjustment can be performed for content being presented at the different premises.

In one embodiment, the device 205 can determine a characteristic of the audience based on a monitored consumption history associated with the audience. In this example, the adjusting of the second segment of the content can include selecting a targeted advertisement from among a group of advertisements and providing the targeted advertisement to the media processor for presentation at the display. The selecting of the targeted advertisement can be according to the level of interest and according to the characteristic of the audience.

In one embodiment, the determining of the content context of the first segment can include applying image pattern recognition and speech pattern recognition to the first segment. In another embodiment, device 205 can determine an expected volume of the expected audience reaction according to the content context of the first segment; determine a sensed volume of the sensed audience reaction according to the sensor data; and compare the sensed volume with the expected volume, where the level of interest in the first segment is determined based in part on the comparing of the sensed volume with the expected volume.

Figure 3:
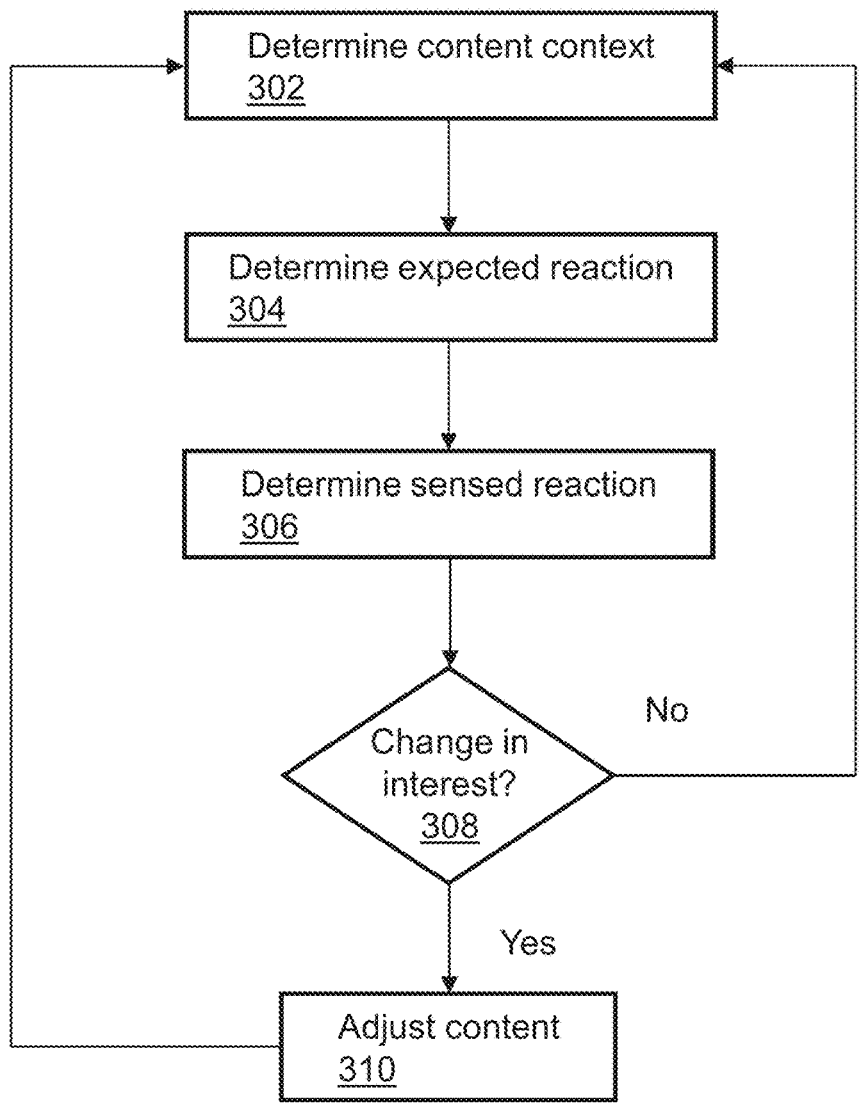
FIG. 3 depicts an illustrative embodiment of a method used in portions of the system described in FIGS. 1 and 2.

FIG. 3 depicts an illustrative embodiment of a method 300 used by systems 100 and 200 for adjusting content according to a level of audience interest determined from a comparison of an expected audience reaction to an actual audience reaction.

Method 300 can commence at 302 where a content context is determined by a system for a first segment of content being presented at a display for an audience. The system can be various devices or combinations of devices, including a media processor presenting the content or a network server. At 304, an expected audience reaction can be determined by the system according to the content context of the first segment. In one embodiment, the expected audience reaction can include an expected volume and/or an expected audio reaction context.

At 306, the system can obtain sensor data that was captured from a sensor device in proximity to the audience. The sensor data can be indicative of a sensed audience reaction to the first segment of the content. In one embodiment, the sensed audience reaction can include a sensed volume and/or a sensed audio reaction context.

At 308 the system can compare the sensed audience reaction (e.g., the sensed volume and/or the sensed audio reaction context) with the expected audience reaction (e.g., the expected volume and/or the expected audio reaction context) to determine change in level of interest for the first segment. If there is no change, then method 300 can return to 302 to continue monitoring for changes in interest to subsequent segments. If on the other hand there is a change in level of interest then at 310 the system can adjust a second segment of the content according to the changed level of interest to generate an adjusted second segment for presentation at the display. For example, if it is determined that the level of interest has increased then the second segment can be adjusted according to that increased level of interest.

In one embodiment, the sensor device can be an audio recorder of a media processor presenting the content at the display, and method 300 can include applying speech recognition to the sensor data to identify words spoken by the audience; and determining the sensed audio reaction context according to the words. In one embodiment, the adjusting of the second segment of the content can include adjusting a resolution of the second segment according to the level of interest.

In one embodiment, the adjusting of the second segment of the content can include increasing a resolution of the second segment being presented by a first media processor at the display, where the adjusting of the resolution of the second segment is performed in conjunction with decreasing of another resolution of second content being presented by a second media processor, and where the first and second media processors are located at a same premises. In one embodiment, method 300 can include transmitting, by the system over a network, the content to a media processor presenting the content at the display, where the obtaining of the sensor data by the system comprises receiving the sensor data captured from the sensor device housed in the media processor.

In one embodiment, the display can be a group of displays located at different premises, where the audience is a group of users located at the different premises, and where the sensor device is a group of sensor devices that are each housed by a corresponding media processor presenting the content at one of the group of displays. In one embodiment, the method 300 can include determining a characteristic of the audience based on a monitored consumption history associated with the audience, where the adjusting of the second segment of the content comprises selecting a targeted advertisement from among a group of advertisements and providing the targeted advertisement for presentation at the display, and where the selecting of the targeted advertisement is according to the level of interest and according to the characteristic of the audience.

In one embodiment, the determining of the content context of the first segment can be based on metadata associated with the content. In one embodiment, the determining of the content context of the first segment can include applying image pattern recognition and speech pattern recognition to the first segment.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
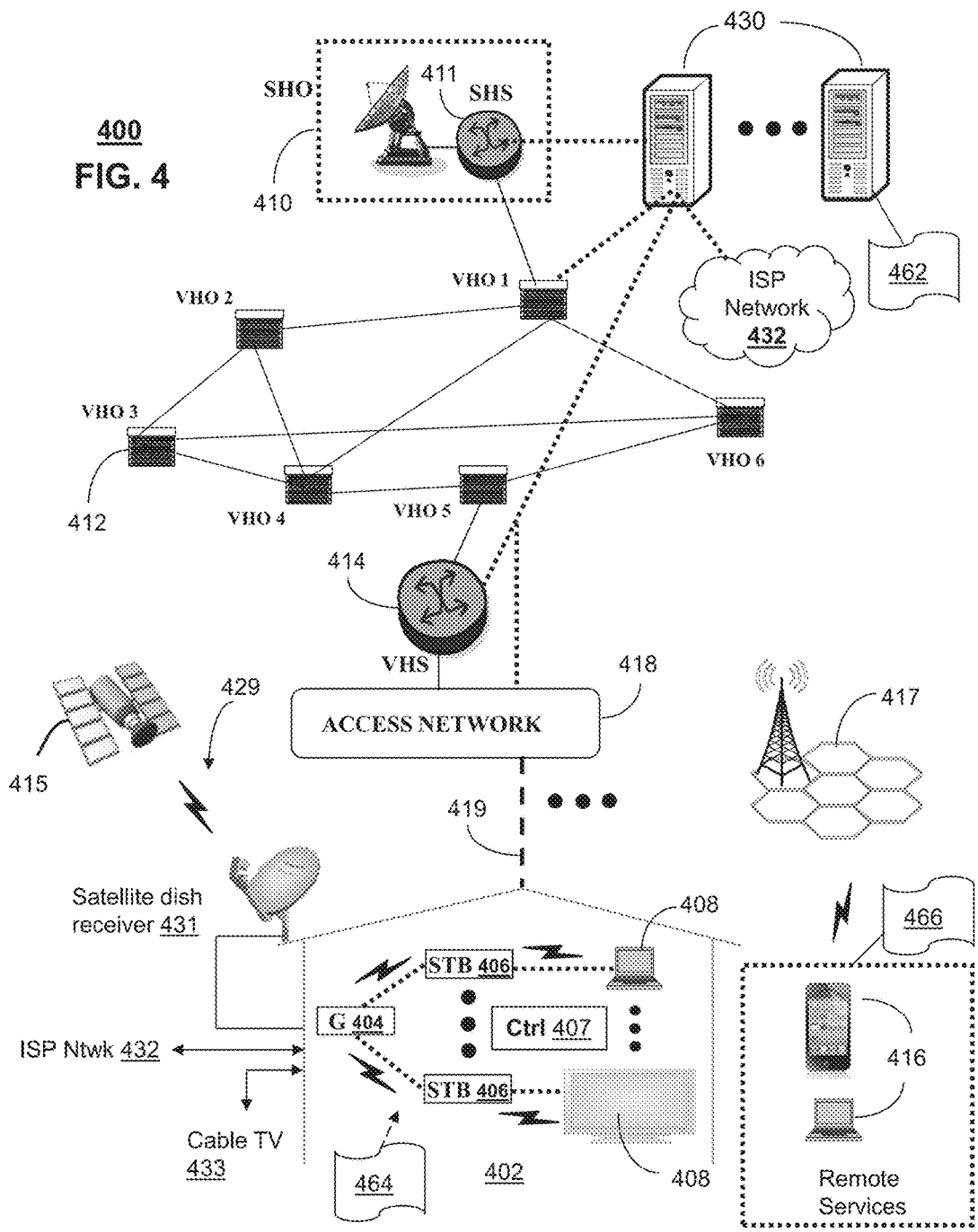
FIG. 4 depicts an illustrative embodiment of a communication system that provides media services including content adjustment based on audience reactions.

FIG. 4 depicts an illustrative embodiment of a first communication system 400 for delivering media content. The communication system 400 can represent an interactive television network, such as an Internet Protocol Television (IPTV) media system. Communication system 400 can be overlaid or operably coupled with systems 100 and 200 of FIGS. 1 and 2 as another representative embodiment of communication system 400. For instance, one or more devices illustrated in the communication system 400 of FIG. 4 can adjust content based on the reaction of the audience. The audience reaction can be compared to an expected audience reaction that is determined from a context of the particular segment of content that the audience is viewing. The audience reaction can be utilized to determine a level of interest or a change in the level of interest which can trigger an adjustment of the content. Various criteria can be utilized for comparing the actual and expected audience reaction, such as monitoring sound volume, determining a context of the audience reaction, such as whether there is excitement directed towards the content or whether the captured sounds are part of a conversation indicating disinterest in the content.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a content adjustment server (herein referred to as server 430). The server 430 can use computing and communication technology to perform function 462, which can include among other things, determining a content context of a first segment of content being presented by a media processor at a display for an audience; determining an expected audience reaction according to the content context of the first segment, where the expected audience reaction comprises an expected audio reaction context; receiving sensor data captured from a sensor device in proximity to the audience, the sensor data indicative of a sensed audience reaction to the first segment of the content; applying speech recognition to the sensor data to identify words spoken by the audience; determining a sensed audio reaction context according to the words; comparing the sensed audio reaction context with the expected audio reaction context to determine a level of interest in the first segment; and/or adjusting a second segment of the content according to the level of interest to generate an adjusted second segment for presentation at the display.

For instance, function 462 of server 430 can be similar to the functions described network server 130 of system 100. The media processors 406 and wireless communication devices 416 can be provisioned with software functions 464 and 466, respectively, to utilize the services of server 430. For instance, functions 46Y and 46Z of media processors 406 and wireless communication devices 416 can be similar to the functions described for the communication devices 106 of FIG. 1 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
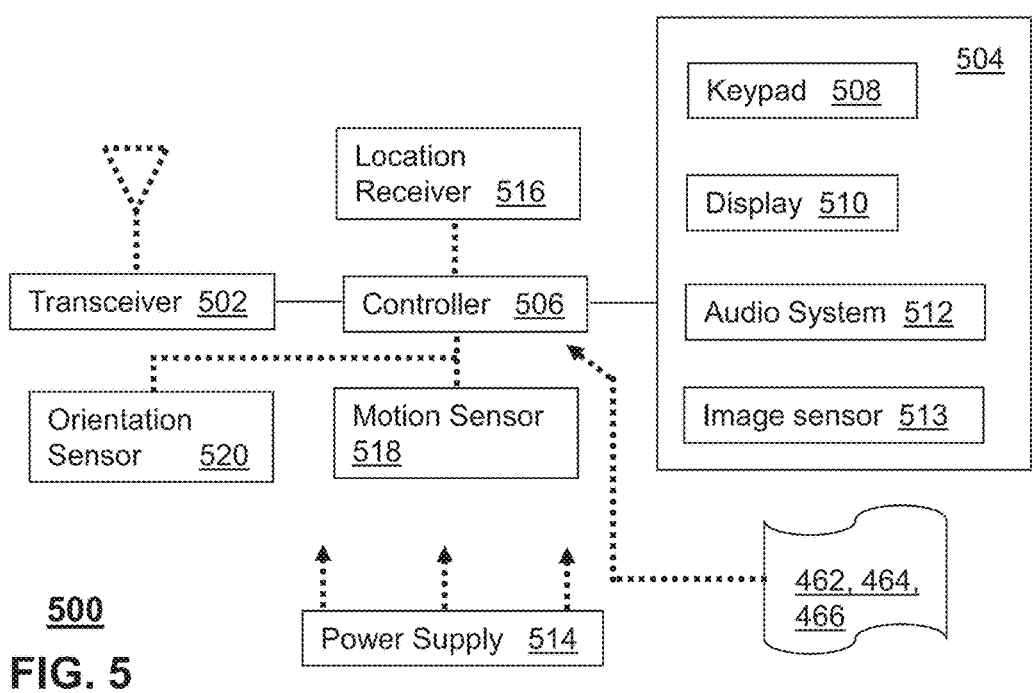
FIG. 5 depicts an illustrative embodiment of a communication device.

FIG. 5 depicts an illustrative embodiment of a communication device 500. Communication device 500 can serve in whole or in part as an illustrative embodiment of the devices depicted in systems 100, 200 and 400 and can be configured to perform portions of method 300. As an example, communication device 500 can determine a content context of a first segment of content; present the first segment of the content at a display for an audience; determine an expected audience reaction according to the content context of the first segment, where the expected audience reaction comprises an expected audio reaction context; obtain sensor data captured from a sensor device in proximity to the display, the sensor data indicative of a sensed audience reaction to the first segment of the content; apply speech pattern recognition to the sensor data to determine a sensed audio reaction context of the sensed audience reaction; compare the sensed audio reaction context with the expected audio reaction context to determine a level of interest in the first segment; increase a resolution of a second segment of the content according to a determination that the level of interest has increased, where the increasing of the resolution of the second segment generates an adjusted second segment; present the adjusted second segment at the display; and/or provide a notice to a second media processor that causes the second media processor to decrease another resolution of other content being presented by the second media processor.

In one embodiment, communication device 500 can determine an expected volume of the expected audience reaction according to the content context of the first segment; determine a sensed volume of the sensed audience reaction according to the sensor data; and compare the sensed volume with the expected volume, where the level of interest in the first segment is determined based in part on the comparing of the sensed volume with the expected volume. In one embodiment, communication device 500 can present a notification at the display indicating that the resolution of the second segment of the content will be increased prior to the presenting of the adjusted second segment at the display.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of devices 106, 130, 205 of FIGS. 1 and 2, the media processor 406, the media devices 408, or the portable communication devices 416 of FIG. 4. It will be appreciated that the communication device 500 can also represent other devices that can operate in systems 100 and 200 of FIGS. 1 and 2], communication system 400 of FIG. 4 such as a gaming console and a media player. In addition, the controller 506 can be adapted in various embodiments to perform the functions 462-466.

Upon reviewing the aforementioned embodiments, it would be evident to an artisan with ordinary skill in the art that said embodiments can be modified, reduced, or enhanced without departing from the scope of the claims described below. For example, other user activity can be monitored to detect a level of interest of a user of the audience, such as detecting a text message, a voice call, or surfing the web on a mobile device of a user of the audience during the presentation of the content which may be indicative of a lack of interest.

Other actions can be triggered by the determination of the level of interest or a change in the level of interest, such as proposing different content to the audience or to a subset of the audience.

In one embodiment, the determination of the level of interest can be multi-tiered based on different thresholds. For example, a scene in a movie can be determined to have a content context of frightening. The expected audience reaction can be determined to be a scream or movement of the audience. If the sensed audience reaction is both a scream and movement then a determination of very high interest can be made. If the sensed audience reaction is either the scream or the movement then a determination of high interest can be made. If the sensed audience reaction is neither the scream nor the movement, but rather silence, then a determination of medium interest can be made. If the sensed audience reaction is neither the scream nor the movement, but rather laughter, then a determination of low interest can be made. The content adjustments can then be made according to the group of different interest levels. For instance, the highest level of interest can result in an increase to the highest resolution and insertion of a targeted advertisement for another movie in the same genre while the lowest level of interest can result in a notification that a different movie of a different genre is currently available.

In one embodiment, sensed audience responses can be distinguished amongst users of the audience and a content adjustment determination can be made according to individual responses. For example, sensed audio can be analyzed via speech pattern recognition to determine that first and second users are engaged in a conversation that is not related to the content (e.g., a football game) being presented. The sensed audio can be further analyzed to determine that third and fourth users are cheering. The determination of which users are speaking can be performed in a number of different ways, such as based on accessible voice samples. In this example, a content adjustment can be made (e.g., a change in resolution of the presented football game or an insertion of a commercial for another football game that is scheduled in the near future) based on the interest of the third and fourth users.

In one embodiment, the content can be broadcast content which is then adjusted by a network server responsive to detecting the change in level of interest. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
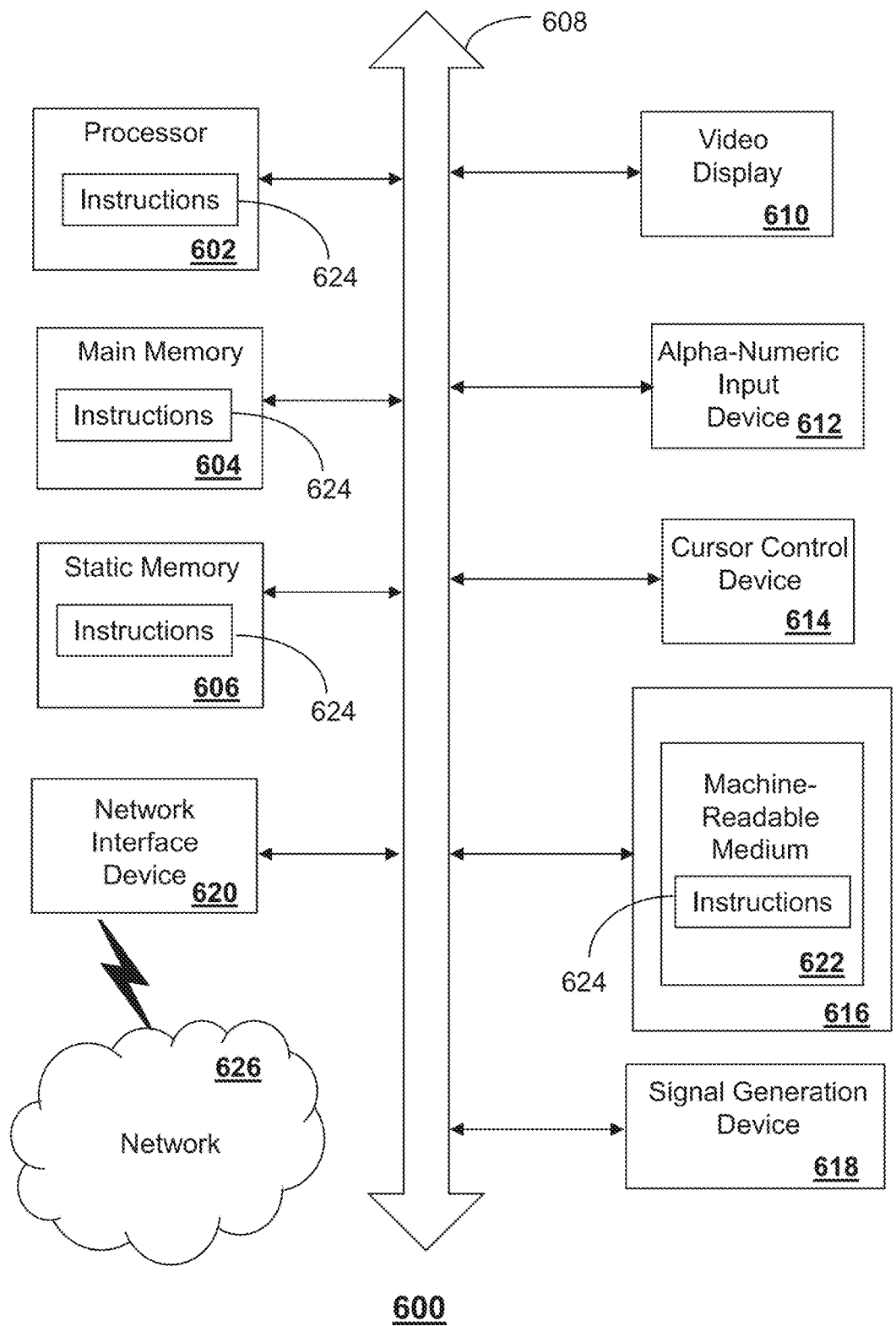
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the media processor 106, the network server 130, the server 430, the media processor 406 and other devices of FIGS. 1-2 and 4 in order to adjust content according to a comparison of an expected audience reaction with a sensed audience reaction. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
transmitting, by a system including a processor, a first content at a first bandwidth to a first media processor and a second content at a second bandwidth to a second media processor, wherein a first total bandwidth comprises the first bandwidth and the second bandwidth;
determining, by the system, a content context of a first segment of the first content being presented at a first display to an audience;
determining, by the system, an expected audience reaction according to the content context of the first segment, wherein the expected audience reaction comprises an expected volume and an expected audio reaction context;
obtaining, by the system, sensor data captured from a sensor device in proximity to the audience, the sensor data indicative of a sensed audience reaction to the first segment of the first content, wherein the sensed audience reaction comprises a sensed volume and a sensed audio reaction context;
comparing, by the system, the sensed volume and the sensed audio reaction context with the expected volume and the expected audio reaction context to determine a level of interest in the first segment;
determining, by the system, that the level of interest is above a threshold;
identifying, by the system, a first genre of the first segment of the first content;
determining, by the system, a target advertisement according to the level of interest and the first genre of the first segment, wherein the target advertisement is associated with the first genre; and
adjusting, by the system, a second segment of the first content according to a determination that the level of interest is above the threshold to generate an adjusted second segment displayable at the first display, and wherein the adjusting of the second segment of the first content comprises increasing a resolution of the second segment being presented by the first media processor at the first display in conjunction with a replacement of the second content being presented by the second media processor at a second display with third content at another resolution that is decreased relative to an original resolution of the second content,
wherein a third genre of the third content is different from a second genre of the second content,
wherein the adjusting of the second segment of the first content comprises presenting the target advertisement,
wherein the increasing of the resolution of the second segment of the first content results in an adjusted first bandwidth,
wherein decreasing of the other resolution of the second content results in an adjusted second bandwidth,
wherein a second total bandwidth comprises the first adjusted bandwidth and the second adjusted bandwidth,
wherein the increasing of the resolution of the second segment of the first content resulting in the adjusted first bandwidth is offset by the decreasing of the other resolution of the second content resulting in the adjusted second bandwidth to maintain the first total bandwidth and the second total bandwidth equal.

2. The method of claim 1, wherein the sensor device is an audio recorder of the first media processor presenting the first content at the first display, and further comprising:
applying speech recognition to the sensor data to identify words spoken by the audience; and
determining the sensed audio reaction context according to the words.

3. The method of claim 1, wherein transmitting the first content comprises transmitting, by the system, the first content to the first media processor presenting the first content at the first display, and
wherein the obtaining of the sensor data by the system comprises receiving the sensor data captured from the sensor device housed in the first media processor.

4. The method of claim 1, wherein presentation of the second content includes presenting the target advertisement, and
wherein the determining of the content context of the first segment is based on metadata associated with the first content.

5. The method of claim 1, wherein the determining of the content context of the first segment comprises applying image pattern recognition and speech pattern recognition to the first segment.

6. A non-transitory machine-readable storage medium, comprising executable instructions that, when executed by a first media processor, facilitate performance of operations, comprising:
receiving a first content at a first bandwidth, wherein a second media processor receives a second content at a second bandwidth, wherein a first total bandwidth comprises the first bandwidth and the second bandwidth;
determining a content context of a first segment of first content;
presenting the first segment of the first content at a first display to an audience;
determining an expected audience reaction according to the content context of the first segment, wherein the expected audience reaction comprises an expected audio reaction context;
obtaining sensor data captured from a sensor device in proximity to the first display, the sensor data indicative of a sensed audience reaction to the first segment of the first content;

applying speech pattern recognition to the sensor data to determine a sensed audio reaction context of the sensed audience reaction;

comparing the sensed audio reaction context with the expected audio reaction context to determine a level of interest in the first segment;

determining that the level of interest is above a threshold;

identifying a first genre of the first segment of the first segment;

determining a target advertisement according to the level of interest and the first genre of the first segment, wherein the target advertisement is associated with the first genre;

increasing a second resolution of a second segment of the first content being presented by the first media processor at the first display in conjunction with a replacement of the second content being presented by a second media processor at a second display with third content at a third resolution that is decreased relative to an original resolution of the second content according to a determination that the level of interest is above the threshold, wherein the increasing of the second resolution of the second segment generates an adjusted second segment, wherein a third genre of the third content is different from a second genre of the second content;

presenting the adjusted second segment at the first display; and providing a notice to the second media processor that causes the second media processor to decrease another resolution of the second content being presented by the second media processor on a second display, wherein generating the second segment of the first content comprises presenting the target advertisement, wherein the increasing of the resolution of the second segment of the first content results in an adjusted first bandwidth, and decreasing of the other resolution of the second content results in an adjusted second bandwidth, wherein a second total bandwidth comprises the first adjusted bandwidth and the second adjusted bandwidth, and wherein the increasing of the resolution of the second segment of the first content resulting in the adjusted first bandwidth is offset by the decreasing of the other resolution of the second content resulting in the adjusted second bandwidth to maintain the first total bandwidth and the second total bandwidth equal.

7. The non-transitory machine-readable storage medium of claim 6, wherein the operations further comprise:

determining an expected volume of the expected audience reaction according to the content context of the first segment;

determining a sensed volume of the sensed audience reaction according to the sensor data; and comparing the sensed volume with the expected volume, wherein the level of interest in the first segment is determined based in part on the comparing of the sensed volume with the expected volume.

8. The non-transitory machine-readable storage medium of claim 6, wherein the operations further comprise:

presenting a notification at the first display indicating that the resolution of the second segment of the first content will be increased prior to the presenting of the adjusted second segment at the first display.

9. A network server, comprising:

a processing system including a processor; and a memory that stores executable instructions that, when executed by the processing system, facilitate performance of operations, comprising:

transmitting a first content at a first bandwidth to a first media processor and a second content at a second bandwidth to a second media processor, wherein a first total bandwidth comprises the first bandwidth and the second bandwidth;

determining a content context of a first segment of first content being presented by first media processor at a first display to an audience;

determining an expected audience reaction according to the content context of the first segment, wherein the expected audience reaction comprises an expected audio reaction context;

receiving sensor data captured from a sensor device in proximity to the audience, the sensor data indicative of a sensed audience reaction to the first segment of the first content;

applying speech recognition to the sensor data to identify words spoken by the audience;

determining a sensed audio reaction context according to the words;

comparing the sensed audio reaction context with the expected audio reaction context to determine a level of interest in the first segment;

determining that the level of interest is above a threshold;

identifying a first genre of the first segment of the first content;

determining a target advertisement according to the level of interest and the first genre of the first segment, wherein the target advertisement is associated with the first genre; and adjusting a second segment of the first content according to a determination that the level of interest is above the threshold to generate an adjusted second segment displayable at the first display, and wherein adjusting the second segment of the first content comprises increasing a resolution of the second segment being presented by the first media processor at the first display in conjunction with a replacement of the second content being presented by the second media processor at a second display with third content at a third resolution that is decreased relative to an original resolution of the second content, wherein the adjusting of the second segment of the first content comprises presenting the target advertisement, wherein the increasing of the resolution of the second segment of the first content results in an adjusted first bandwidth, and the decreasing of the other resolution of the second content results in an adjusted second bandwidth, wherein a second total bandwidth comprises the first adjusted bandwidth and the second adjusted bandwidth, and wherein the increasing of the resolution of the second segment of the first content resulting in the adjusted first bandwidth is offset by the decreasing of the other resolution of the second content resulting in the adjusted second bandwidth to maintain the first total bandwidth and the second total bandwidth equal.

10. The network server of claim 9, wherein the sensor device is an audio recorder of the first media processor presenting the first content at the first display, and further comprising:
   applying speech recognition to the sensor data to identify words spoken by the audience; and
   determining the sensed audio reaction context according to the words.

11. The network server of claim 9, wherein presentation of the second content includes presenting the target advertisement, and wherein a third genre of the third content is different from a second genre of the second content.

12. The network server of claim 9, wherein the determining of the content context of the first segment is based on metadata associated with the first content.

13. The network server of claim 9, wherein the determining of the content context of the first segment comprises applying image pattern recognition and speech pattern recognition to the first segment.

14. The network server of claim 9, wherein the operations further comprise:
   determining an expected volume of the expected audience reaction according to the content context of the first segment;
   determining a sensed volume of the sensed audience reaction according to the sensor data; and
   comparing the sensed volume with the expected volume, wherein the level of interest in the first segment is determined based in part on the comparing of the sensed volume with the expected volume.

15. The method of claim 1, wherein the increasing of the resolution of the second segment of the first content comprises increasing the resolution of the second segment from standard definition resolution to high definition resolution.

16. The method of claim 1, wherein the decreasing of the other resolution of the second content comprises decreasing the other resolution of the second content from high definition resolution to standard definition resolution.

17. The network server of claim 9, wherein the increasing of the resolution of the second segment of the first content comprises increasing the resolution of the second segment from standard definition resolution to high definition resolution.

18. The network server of claim 9, wherein the decreasing of the other resolution of the second content comprises decreasing the other resolution of the second content from high definition resolution to standard definition resolution.

19. The method of claim 1, wherein the second content is an episode of a show and the third content is a different episode of the show.

20. The method of claim 1, wherein the second content is a movie and the third content is a different movie.

* * * * *